US011939817B2

(12) United States Patent
Wang

(10) Patent No.: US 11,939,817 B2
(45) Date of Patent: Mar. 26, 2024

(54) AUTOMATICALLY LOCKED RETRACTABLE PROTECTIVE DOOR SILL

(71) Applicant: GUANGZHOU TUSUNNY HOME PRODUCTS CO., LTD, Guangdong (CN)

(72) Inventor: Hongjuan Wang, Guangdong (CN)

(*) Notice: Subject to any disclaimer, the term of this patent is extended or adjusted under 35 U.S.C. 154(b) by 0 days.

(21) Appl. No.: 17/841,875

(22) Filed: Jun. 16, 2022

(65) Prior Publication Data

US 2023/0366269 A1 Nov. 16, 2023

(30) Foreign Application Priority Data

May 16, 2022 (CN) ......................... 202221173308.2

(51) Int. Cl.
*E06B 9/80* (2006.01)
*E06B 9/08* (2006.01)
*E06B 9/86* (2006.01)

(52) U.S. Cl.
CPC .................. *E06B 9/86* (2013.01); *E06B 9/08* (2013.01); *E06B 2009/801* (2013.01)

(58) Field of Classification Search
CPC ..... E06B 9/86; E06B 9/08; E06B 9/82; E06B 9/88; E06B 2009/801; E06B 2009/002; E06B 11/02; A47D 13/00
See application file for complete search history.

(56) References Cited

U.S. PATENT DOCUMENTS

| | | | | |
|---|---|---|---|---|
| 6,907,914 | B1 * | 6/2005 | Lundh | E06B 9/13 403/105 |
| 7,438,112 | B2 * | 10/2008 | Cheng | E06B 9/80 242/385.4 |
| 9,482,052 | B2 * | 11/2016 | Sousa | E01F 13/028 |
| 9,556,673 | B2 * | 1/2017 | Stover | E06B 11/00 |
| 2016/0168907 | A1 * | 6/2016 | Byun | E06B 9/326 160/178.2 |
| 2018/0044982 | A1 * | 2/2018 | Wang | E06B 9/08 |
| 2019/0078382 | A1 * | 3/2019 | Wang | E06B 9/174 |
| 2022/0056651 | A1 * | 2/2022 | Liang | E06B 9/90 |
| 2022/0235594 | A1 * | 7/2022 | Laws | E06B 11/02 |

FOREIGN PATENT DOCUMENTS

| | | |
|---|---|---|
| CN | 215565593 U | 1/2022 |
| CN | 216197748 U | 4/2022 |

* cited by examiner

*Primary Examiner* — Daniel P Cahn
*Assistant Examiner* — Jeremy C Ramsey

(57) ABSTRACT

The present discloses an automatically locked retractable protective door sill, including a retractable curtain assembly, a scroll assembly, an upper fixing base and a lower fixing base, a dial mechanism and a locking mechanism are arranged in the upper fixing base, the locking mechanism includes a hydraulic rod capable of retracting at a fixed time, and the hydraulic rod is connected to the dial mechanism; the sliding base is connected to the hydraulic rod, and the hydraulic rod drives the sliding base and drives the linkage base to reset automatically, so the automatic locking of the locking mechanism is achieved, and then the scroll assembly is locked. The whole device has a simpler structure and more convenient operation, the dial button may be manually pushed to return for locking after not reaching the set time, so as to prevent children opening the door sill during an automatic locking process.

7 Claims, 7 Drawing Sheets

AUTOMATICALLY LOCKED RETRACTABLE PROTECTIVE DOOR SILL

TECHNICAL FIELD

The present disclosure relates to the technical field of children protective products, in particular to a retractable protective door sill for preventing children going out from a room.

BACKGROUND

In order to prevent children going out frown a room, causing lost, personal injury and other accidents, families with children often install a retractable protective door sill for an interior door. This kind of protective door sill mainly includes a retractable curtain assembly, an upper fixing base, a lower fixing base, a scroll assembly, a hook, a hook base, etc. The retractable curtain assembly is connected to the scroll assembly, so that the retractable curtain assembly may be pulled out or wound automatically through the scroll assembly. Usually, a locking mechanism is arranged in the upper fixing base, and after being locked, the scroll assembly cannot rotate or wind the retractable curtain assembly. After being unlocked, the scroll assembly will rotate automatically, so that the automatic winding of the retractable curtain assembly is achieved.

In order to prevent children unlocking or unlocking by mistake, the button of the existing retractable protective door sill is designed to a structure, which can be locked when manually dialed to a locking position, and can be unlocked when manually dialed to an unlocking, position. However, this structure will enable users to forget locking after withdrawing and hanging the retractable curtain, thereby causing a potential safety hazard. Therefore, someone has designed a structure which can achieve automatic locking by setting a preset time through a hydraulic rod. For example, after the retractable curtain is withdrawn for several seconds, the hydraulic rod will retract automatically to achieve locking the scroll assembly. However, the existing protective door sill has a more complicated structure and more trouble operation, specifically the retractable curtain can be pulled out when pressing the button by two hands, so it is very inconvenient. In addition, due to the defect on the structure design of the existing protective door sill, the protective door sill can be locked automatically through the hydraulic rod after the preset time, and the quick manual locking cannot be achieved.

SUMMARY

To solve the defect in the prior art, the present disclosure provides an automatically locked retractable protective door sill, which has a simpler structure, a more rational design and more convenient operation, and is not easy to be unlocked by children.

To solve the above technical problem, the present disclosure adopts the following technical solution: an automatically locked retractable protective door sill includes a retractable curtain assembly, a scroll assembly, an upper fixing base and a lower fixing base, the upper fixing base and the lower fixing base are respectively assembled at the upper and lower ends of the scroll assembly, and the retractable curtain assembly is connected to the scroll assembly and wound by the scroll, assembly; a dial mechanism and a locking mechanism are arranged in the upper fixing base, and the scroll assembly is connected to the locking mechanism; the locking mechanism includes a hydraulic rod capable of retracting at a fixed time, the hydraulic rod is connected to the dial mechanism, wherein the dial mechanism includes a dial button, a sliding base and a linkage base, the dial button is exposed outside a shell of the upper fixing base, the sliding base and the linkage base are mounted in the shell, the linkage base is docked with the locking mechanism, the dial button penetrates through the sliding base and is connected to the linkage base, and the dial button pushes the linkage base to move so that the locking mechanism locks or unlocks the scroll assembly; and the sliding base is connected to the hydraulic rod, and the hydraulic rod drives the sliding base and drives the linkage base to reset automatically, so the automatic locking of the locking mechanism is achieved.

Further, a gear bearing assembly is arranged in the upper fixing base, and the gear bearing assembly is assembled with the scroll assembly to rotate along the scroll assembly; and the locking mechanism includes a locking member, which is docked with the gear bearing assembly, and a gear of the gear bearing assembly is locked by the locking member so as to achieve locking the scroll assembly. Certainly, this is the prior art.

Further, the linkage base is provided with a linkage arm, which is docked with the locking member. When the linkage base moves, the locking member is pushed through the linkage arm to break away from the gear bearing assembly. At this time, the gear bearing assembly may rotate, and the retractable curtain may be pulled out and retracted.

Further, a mounting base is mounted in the shell of the upper fixing base, a first mounting groove and a threading hole are formed in the mounting base, and the hydraulic rod is mounted in the first mounting groove; the sliding base is located on the mounting base, a sliding hole is formed in the sliding base, and the sliding hole is opposite to the threading hole up and down; and a dial groove is arranged on the shell, the dial button is arranged in the dial groove and capable of being dialed in the dial groove, and a dial rod of the dial button is downwards, successively penetrates through the sliding hole and the threading hole, and is fixedly connected to the linkage base.

Further, a dial button base is arranged on the sliding base, the dial button is mounted on the dial button base by a reset spring, and the dial button pops up by the reset spring.

Further, a second mounting groove is also arranged on the mounting base, and a tension spring is arranged in the second mounting groove; and one end of the tension spring is fixed on the mounting base, and the other end is fixedly connected to the sliding base, so as to assist the reset of the sliding base. By selecting the tension spring with different elastic force to cooperate with the hydraulic rod, the different reset time of the dial button may be set, such as 10s, 15s, etc. The dial button returns to an original position at a fixed time after loosening the retractable curtain, the dial rod pushes the linkage base to reset, the linkage base is buckled with the gear when the linkage arm pushes the tooth of the locking member, at this time the gear bearing assembly and the scroll assembly are locked, and the retractable curtain may not be pulled out or retracted.

Further, the first mounting groove and the second mounting groove are arranged at the two sides of the threading hole in parallel, two fixing columns are arranged at the bottom of the sliding base, the two fixing columns are respectively inserted into the first mounting groove and the second mounting groove, and the hydraulic rod and the tension spring are fixedly connected to one fixing column in respective.

Further, the locking member is mounted in the shell of the upper fixing base through a torsional spring, and the locking member is pushed to reset by the twisting force of the torsional spring, so as to lock the gear.

The present disclosure enables the dial button to link with the hydraulic rod directly by arranging the sliding base, and after the dial button is pushed to an unlocking position, the retractable curtain may be pulled out and retracted automatically. During a set time, the sliding base is pulled automatically by the function of the hydraulic rod, so that the dial button returns to a locking position and the scroll assembly is locked. Thus, the advantage is that the whole device has a simpler structure and more convenient operation. The unfolding operation of the door sill may be finished in a manner that one hand pushes the dial button and the other hand pulls out the retractable curtain. In addition, even not reaching the set time, the dial button may be manually pushed to return for locking, and children may be prevented from opening the door sill during the process of automatic locking.

In the figure: 1-upper fixing base, 2-dial button, 21-dial rod, 3-dial button base, 4-sliding base, 41-sliding hole, 42-fixing column, 5-mounting base, 51-first mounting groove, 52-second mounting groove, 53-threading hole, 6-hydraulic rod, 7-linkage base, 71-linkage arm, 8-locking member, 9-gear bearing assembly, 91-gear, 10-tension spring, 11-shell, 12-torsional spring, 13-lower fixing base, 14-scroll assembly, 15-retractable curtain assembly, 16-dial groove, 17-dial mechanism, 18-locking mechanism, 19-reset spring.

DETAILED DESCRIPTION OF THE EMBODIMENTS

Figure 1:
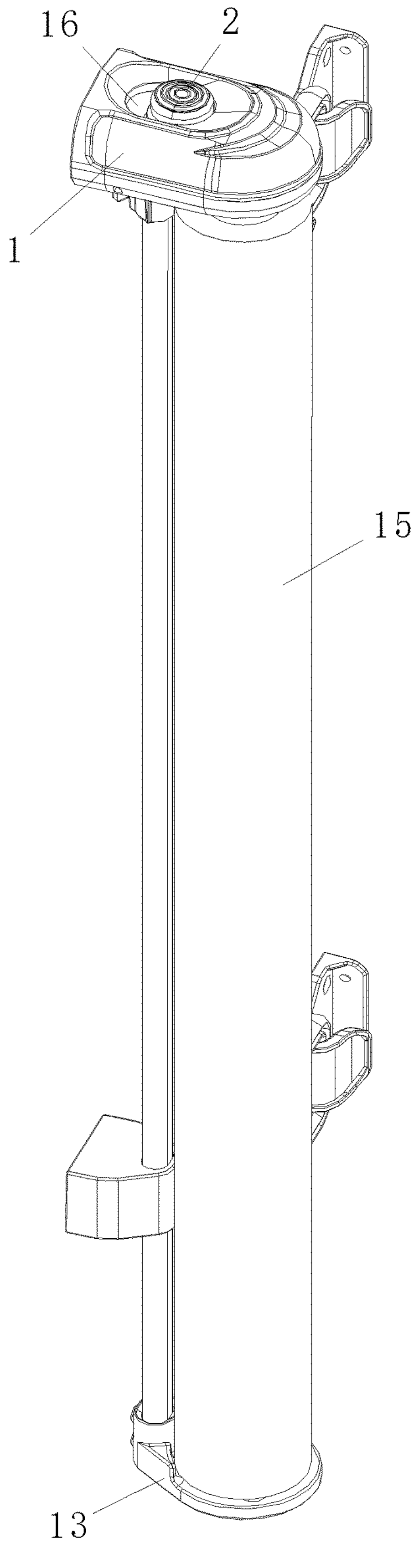
FIG. 1 is an overall structure diagram of the present disclosure.
Figure 2:
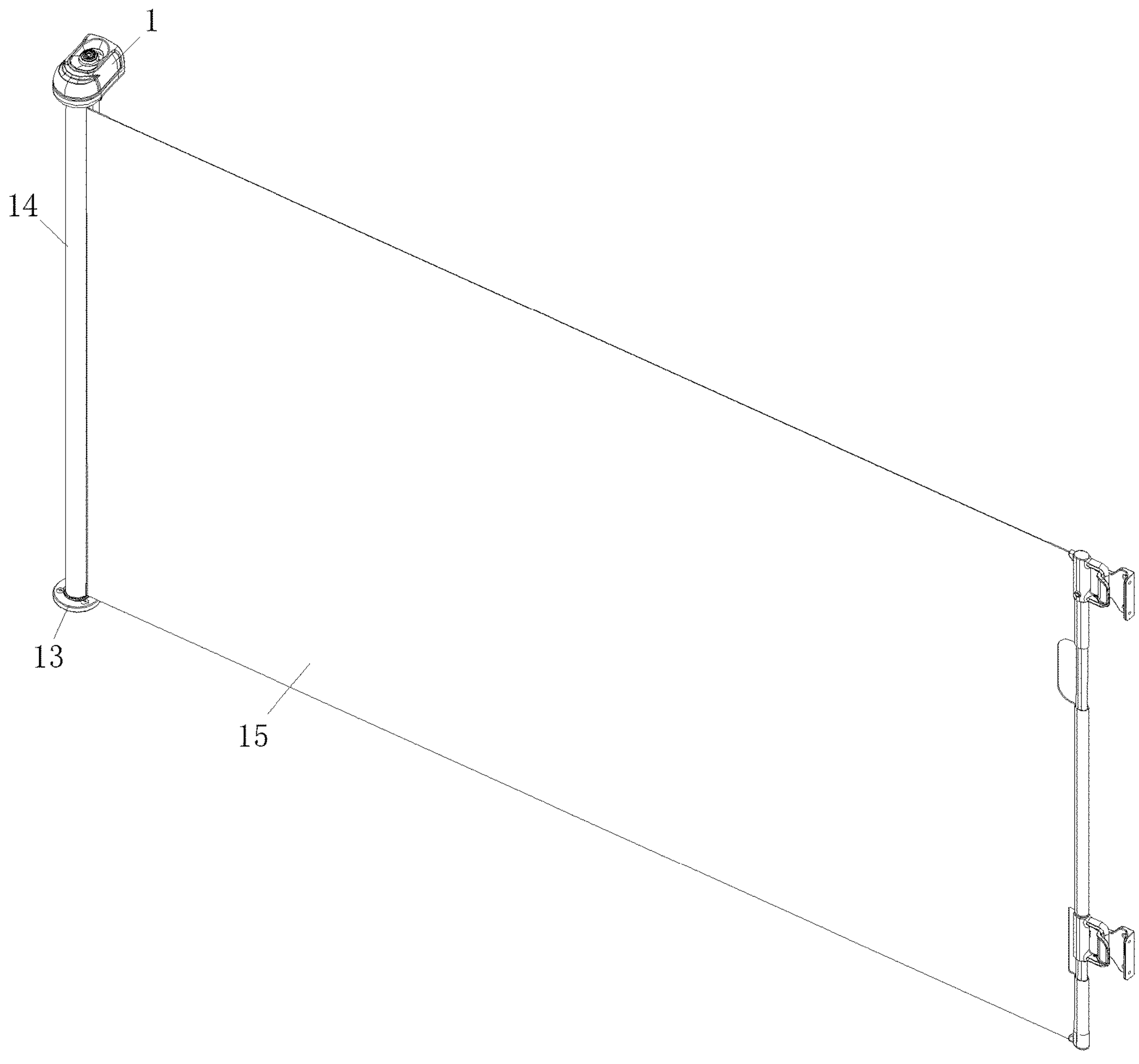
FIG. 2 is a using state diagram of a retractable curtain assembly after being pulled out in the present disclosure.
Figure 3:
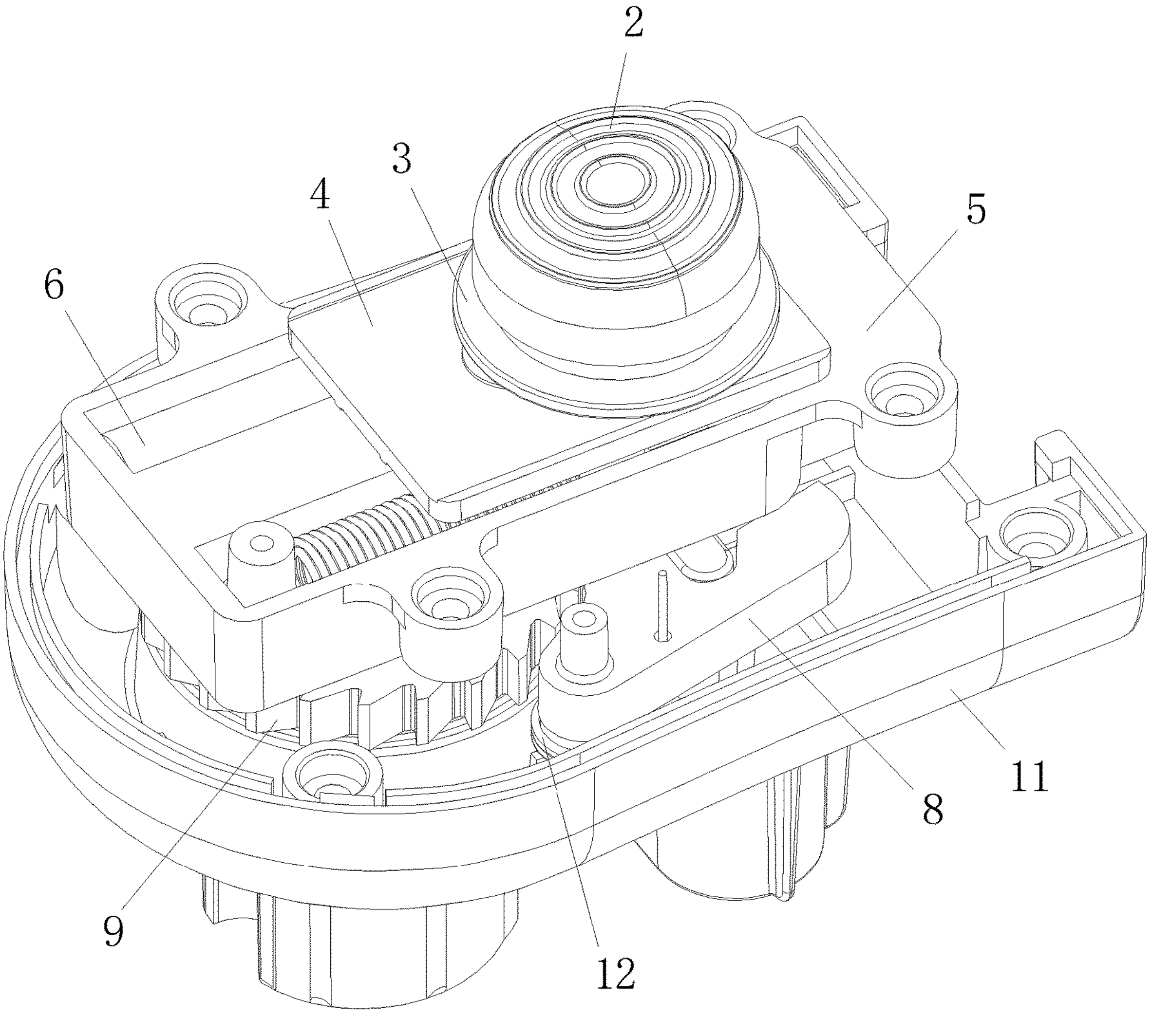
FIG. 3 is an internal structure diagram of an upper fixing base.
Figure 4:
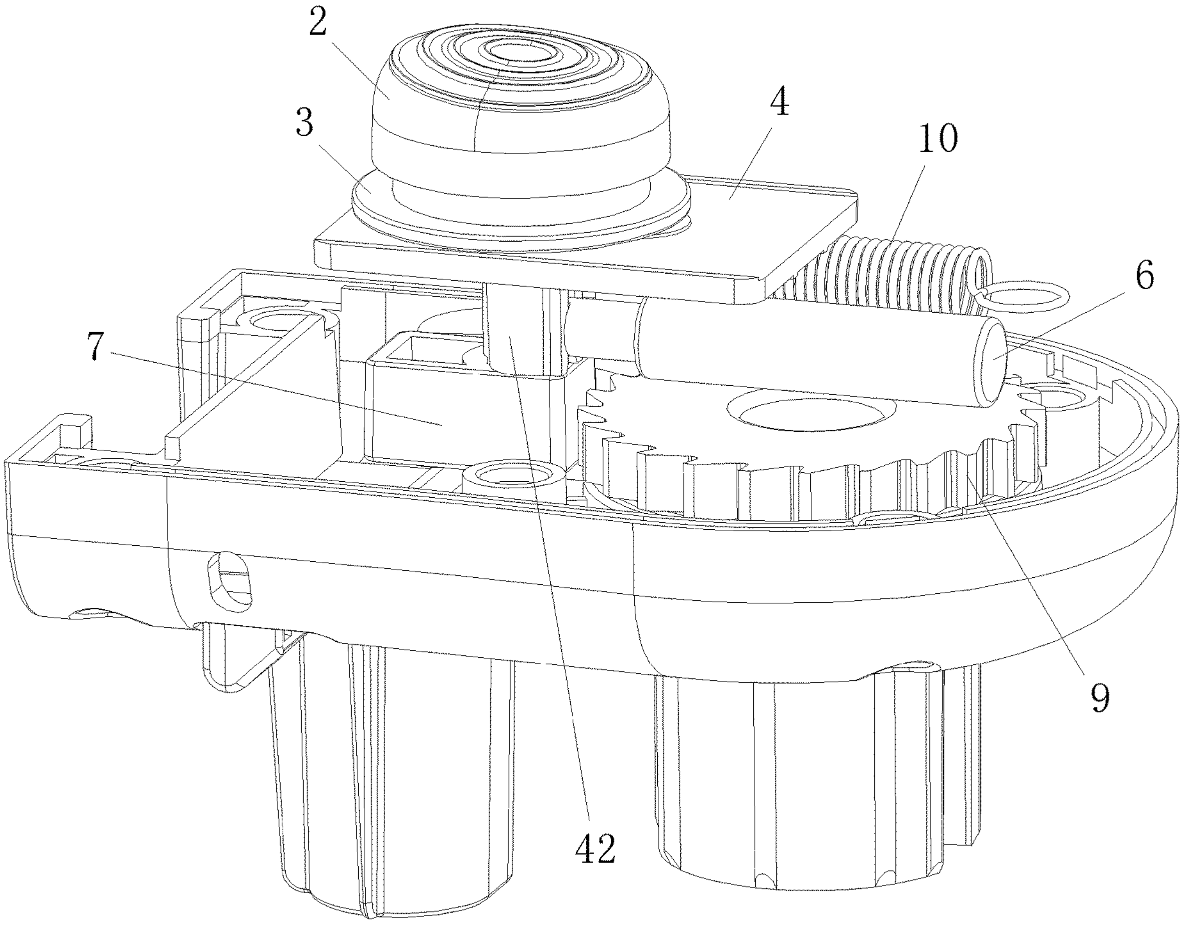
FIG. 4 is a second internal structure diagram of an upper fixing base.
Figure 5:
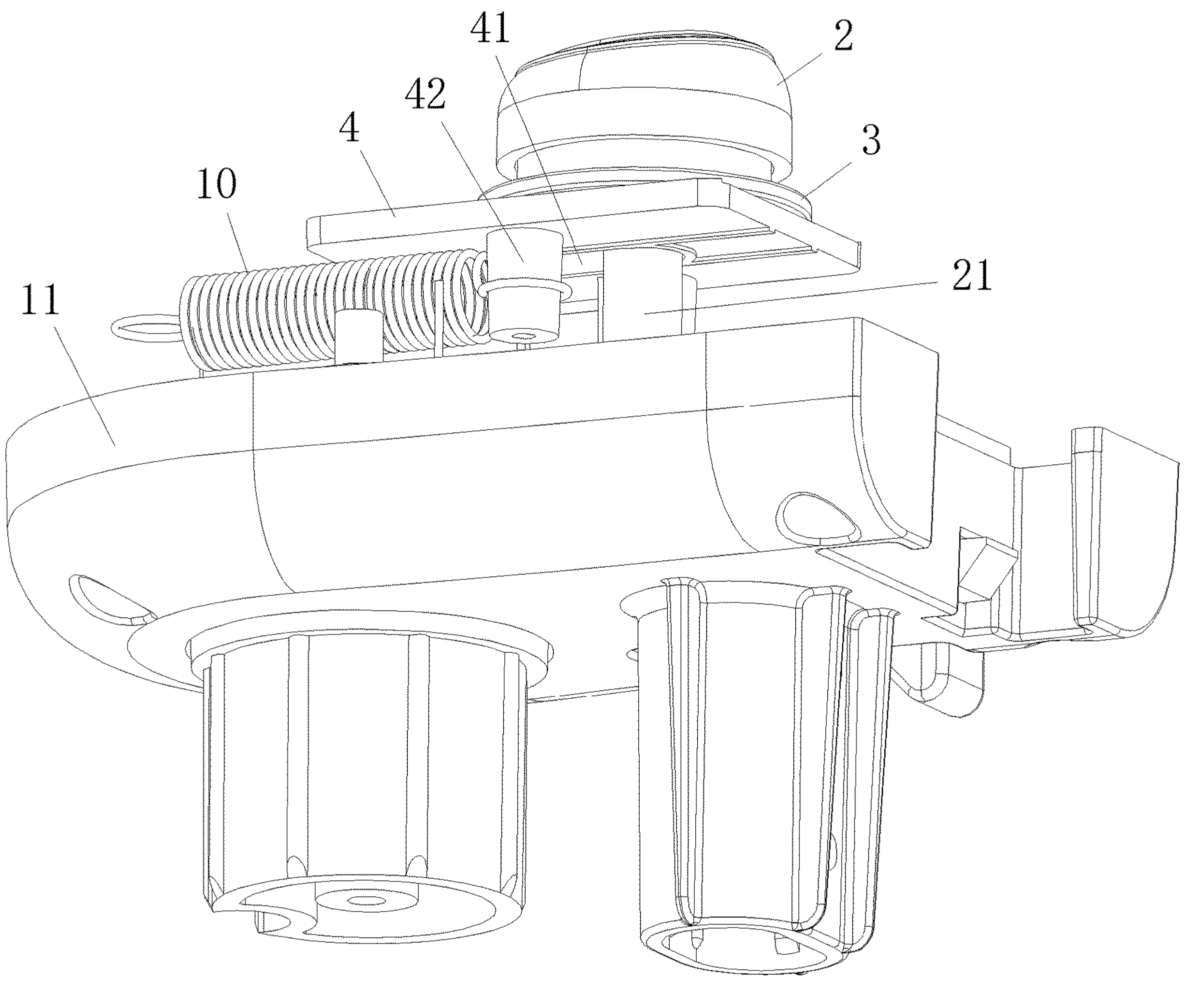
FIG. 5 is a third internal structure diagram of an upper fixing base.
Figure 6:
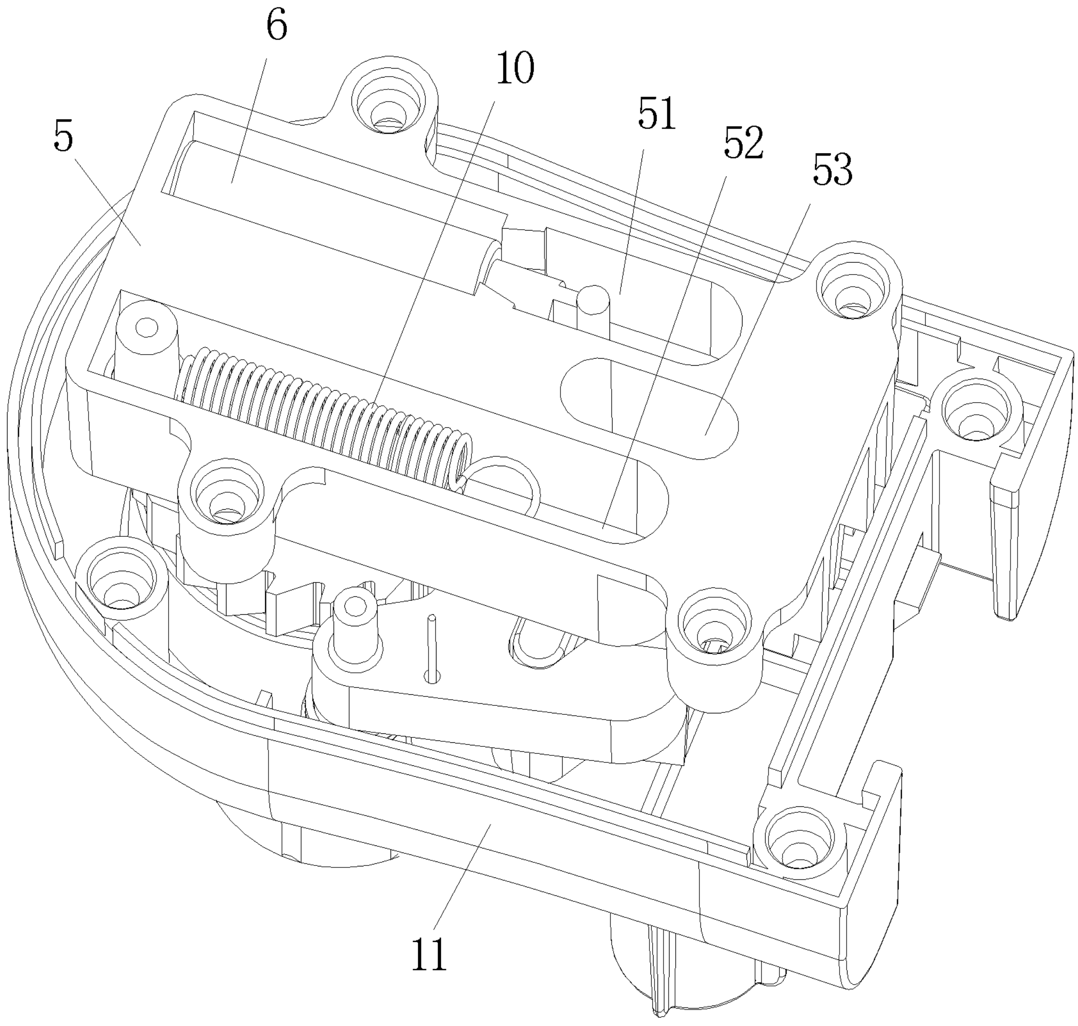
FIG. 6 is a fourth internal structure diagram of an upper fixing base.
Figure 7:
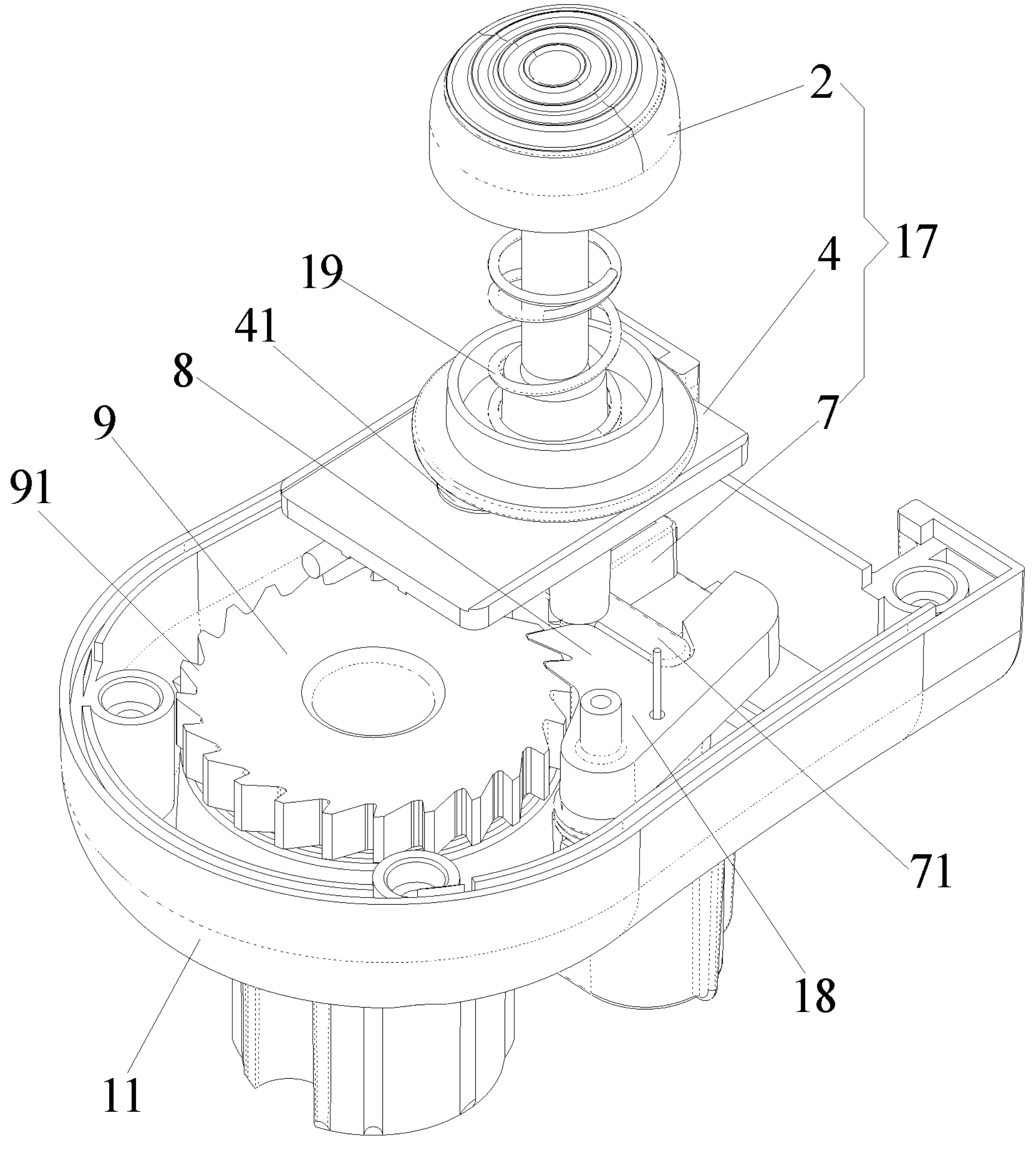
FIG. 7 is a fifth internal structure diagram of an upper fixing base.

In this embodiment, referring to FIG. 1-FIG. 7, the automatically locked retractable protective door sill includes a retractable curtain assembly 15, a scroll assembly 14, an upper fixing base 1 and a lower fixing base 13, the upper fixing base 1 and the lower fixing base 13 are respectively assembled at the upper and lower ends of the scroll assembly 14, and the retractable curtain assembly 15 is connected to the scroll assembly 14 and wound by the scroll assembly 14. A dial mechanism 17 and a locking mechanism 18 are arranged in the upper fixing base 1, and the scroll assembly 14 is connected to the locking mechanism 18; the locking mechanism 18 includes a hydraulic rod 6 capable of retracting at a fixed time, and the hydraulic rod 6 is connected to the dial mechanism 17; the dial mechanism 17 includes a dial button 2, a sliding base 4 and a linkage base 7, the dial button 2 is exposed outside a shell 11 of the upper fixing base 1, the sliding base 4 and the linkage base 7 are mounted in the shell 11, the linkage base 7 is docked with the locking mechanism 18, the dial button 2 penetrates through the sliding base 4 and is connected to the linkage base 7, and the dial button 2 pushes the linkage base 7 to move so that the locking mechanism 18 locks or unlocks the scroll assembly 14; and the sliding base 4 is connected to the hydraulic rod 6, and the hydraulic rod 6 drives the sliding base 4 and drives the linkage base 7 to reset automatically, so the automatic locking of the locking mechanism 18 is achieved.

A gear bearing assembly 9 is arranged in the upper fixing base 1, and the gear bearing assembly 9 is assembled with the scroll assembly 14 to rotate along the scroll assembly 14; and the locking mechanism 18 includes a locking member 8, which is docked with the gear bearing assembly 9, and a gear 91 of the gear bearing assembly 9 is locked by the locking member 8 so as to achieve locking the scroll assembly 14. Certainly, this is the prior art.

The linkage base 7 is provided with a linkage arm 71, which is docked with the locking member 8. When the linkage base 7 moves, the locking member 8 is pushed through the linkage arm 71 to break away from the gear bearing assembly 9. At this time, the gear bearing assembly 9 may rotate, and the retractable curtain may be pulled out and retracted.

A mounting base 5 is mounted in the shell 11 of the upper fixing base 1, a first mounting groove 51 and a threading hole 53 are formed in the mounting base 5, and the hydraulic rod 6 is mounted in the first mounting groove 51; the sliding base 4 is located on the mounting base 5, a sliding hole 41 is formed in the sliding base 4, and the sliding hole 41 is opposite to the threading hole 53 up and down; and a dial groove 16 is arranged on the shell 11, the dial button 2 is arranged in the dial groove 16 and capable of being dialed in the dial groove 16, and a dial rod 21 of the dial button 2 is downwards, successively penetrates through the sliding hole 41 and the threading hole 53, and is fixedly connected to the linkage base 7.

A dial button base 3 is arranged on the sliding base 4, the dial button 2 is mounted on the dial button base 3 by a reset spring 19, and the dial button 2 pops up by the reset spring 19.

A second mounting groove 52 is also arranged on the mounting base 5, and a tension spring 10 is arranged in the second mounting groove 52; and one end of the tension spring 10 is fixed on the mounting base 5, and the other end is fixedly connected to the sliding base 4, so as to assist, the reset of the sliding base 4. By selecting the tension spring 10 with different elastic force to cooperate with the hydraulic rod 6, the different reset time of the dial button 2 may be set, such as 10s, 15s, etc. The dial button 2 returns to an original position at a fixed time after loosening the retractable curtain, such as 15s, the dial rod 21 pushes the linkage base 7 to reset, the linkage base 7 is buckled with the gear 91 when the linkage arm 72 pushes the tooth of the locking member 8, at this time the gear bearing assembly 9 and the scroll assembly 14 are locked, and the retractable curtain may not be pulled out or retracted.

The first mounting groove 51 and the second mounting groove 52 are arranged at the two sides of the threading hole 53 in parallel, two fixing columns 42 are arranged at the bottom of the sliding base 4, the two fixing columns 42 are respectively inserted into the first mounting groove 51 and the second mounting groove 52, and the hydraulic rod 6 and the tension spring 10 are fixedly connected to one fixing column 42 in respective.

The locking member 8 is mounted in the shell 11 of the upper fixing base 1 through the torsional spring 12, and the locking member 8 is pushed to reset by the twisting force of the torsional spring 12, so as to lock the gear 91. This is also the prior art.

The present disclosure has been described in detail above. The above mentioned is merely a preferred embodiment of the present disclosure. When the scope of the present disclosure cannot be limited, namely, equal change and modification made within the scope of this application shall fall in the scope of the present disclosure.

What is claimed is:

1. An automatically locked retractable protective door sill, comprising:

a retractable curtain assembly (15), a scroll assembly (14), an upper fixing base (1) and a lower fixing base (13), wherein the upper fixing base (1) and the lower fixing base (13) are respectively assembled at upper and lower ends of the scroll assembly (14), and the retractable curtain assembly (15) is connected to the scroll assembly (14) and wound by the scroll assembly (14); a dial mechanism (17) and a locking mechanism (18) are arranged in the upper fixing base (1), and the scroll assembly (14) is connected to the locking mechanism (18); the locking mechanism (18) comprises a hydraulic rod (6) capable of retracting at a fixed time, the hydraulic rod (6) is connected to the dial mechanism (17), wherein the dial mechanism (17) comprises a dial button (2), a sliding base (4) and a linkage base (7), the dial button (2) is exposed outside a shell (11) of the upper fixing base (1), the sliding base (4) and the linkage base (7) are mounted in the shell (11), the linkage base (7) is docked with the locking mechanism (18), the dial button (2) penetrates through the sliding base (4) and is connected to the linkage base (7), and the dial button (2) pushes the linkage base (7) to move so that the locking mechanism (18) locks or unlocks the scroll assembly (14); and the sliding base (4) is connected to the hydraulic rod (6), and the hydraulic rod (6) drives the sliding base (4) and drives the linkage base (7) to reset automatically, so that automatic locking of the locking mechanism (18) is achieved;

wherein a mounting base (5) is mounted in the shell (11) of the upper fixing base (1), a first mounting groove (51) and a threading hole (53) are formed in the mounting base (5), and the hydraulic rod (6) is mounted in the first mounting groove (51); the sliding base (4) is located on the mounting base (5), a sliding hole (41) is formed in the sliding base (4), and the sliding hole (41) is opposite to the threading hole (53) in an up down direction; and a dial groove (16) is arranged on the shell (11), the dial button (2) is arranged in the dial groove (16), and a dial rod (21) of the dial button (2) is downwards, successively penetrates through the sliding hole (41) and the threading hole (53), and is fixedly connected to the linkage base (7).

2. The automatically locked retractable protective door sill according to claim 1, wherein a gear bearing assembly (9) is arranged in the upper fixing base (1), and the gear bearing assembly (9) is assembled with the scroll assembly (14) and can be rotated with the scroll assembly (14); and the locking mechanism (18) comprises a locking member (8), which is docked with the gear bearing assembly (9), and a gear (91) of the gear bearing assembly (9) is locked by the locking member (8) so as to achieve locking the scroll assembly (14).

3. The automatically locked retractable protective door sill according to claim 2, wherein the linkage base (7) is provided with a linkage arm (71), which is docked with the locking member (8), when the linkage base (7) moves, the locking member (8) is pushed by the linkage arm (71) to break away from the gear bearing assembly (9).

4. The automatically locked retractable protective door sill according to claim 1, wherein a dial button base (3) is arranged on the sliding base (4), the dial button (2) is mounted on the dial button base (3) by a reset spring (19).

5. The automatically locked retractable protective door sill according to claim 1, wherein a second mounting groove (52) is also arranged on the mounting base (5), and a tension spring (10) is arranged in the second mounting groove (52); and one end of the tension spring (10) is fixed on the mounting base (5), and the other end is fixedly connected to the sliding base (4), so as to assist the reset of the sliding base (4).

6. The automatically locked retractable protective door sill according to claim 5, wherein the first mounting groove (51) and the second mounting groove (52) are arranged at the two sides of the threading hole (53) in parallel, two fixing columns (42) are arranged at the bottom of the sliding base (4), the two fixing columns (42) are respectively inserted into the first mounting groove (51) and the second mounting groove (52), and the hydraulic rod (6) and the tension spring (10) are each fixedly connected to a respective one of the fixing columns (42).

7. The automatically locked retractable protective door sill according to claim 3, wherein the locking member (8) is mounted in the shell (11) of the upper fixing base (1) through a torsional spring (12), and the locking member (8) is pushed to reset by twisting force of the torsional spring (12).

* * * * *